(12) United States Patent
Durand et al.

(10) Patent No.: US 11,754,708 B1
(45) Date of Patent: Sep. 12, 2023

(54) OBJECT DETECTION USING PROPELLER NOISE

(71) Applicant: Amazon Technologies, Inc., Seattle, WA (US)

(72) Inventors: Jean-Guillaume Dominique Durand, Seattle, WA (US); Chengwu Luke Cui, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1,135 days.

(21) Appl. No.: 16/214,571

(22) Filed: Dec. 10, 2018

(51) Int. Cl.
| | |
|---|---|
| *G01S 15/93* | (2020.01) |
| *G01S 15/32* | (2006.01) |
| *B64C 39/02* | (2023.01) |
| *G01S 15/04* | (2006.01) |
| *B64U 10/10* | (2023.01) |
| *B64U 101/30* | (2023.01) |

(52) U.S. Cl.
CPC .............. *G01S 15/93* (2013.01); *B64C 39/024* (2013.01); *G01S 15/04* (2013.01); *G01S 15/325* (2013.01); *B64U 10/10* (2023.01); *B64U 2101/30* (2023.01); *B64U 2201/10* (2023.01)

(58) Field of Classification Search
None
See application file for complete search history.

(56) References Cited

U.S. PATENT DOCUMENTS

| | | | |
|---|---|---|---|
| 9,290,266 B2* | 3/2016 | Robertson et al. | B64C 27/12 |
| 9,442,496 B1* | 9/2016 | Beckman et al. | G05D 27/02 |
| 9,928,748 B2* | 3/2018 | Chan et al. | B64C 39/024 |
| 10,017,249 B1* | 7/2018 | Tseng et al. | B64C 27/20 |
| 10,101,196 B2* | 10/2018 | Naguib et al. | G01S 5/186 |
| 10,118,692 B1* | 11/2018 | Beckman et al. | G06Q 10/0832 |
| 2015/0260526 A1* | 9/2015 | Paduano et al. | G01C 23/00 701/461 |
| 2016/0083073 A1* | 3/2016 | Beckman | G09F 9/33 244/1 N |
| 2017/0174317 A1* | 6/2017 | Beckman et al. | B64C 27/32 |
| 2017/0219686 A1* | 8/2017 | Xie et al. | G01S 11/14 |
| 2017/0372625 A1* | 12/2017 | Horinouchi | B64C 39/024 |
| 2018/0118337 A1* | 5/2018 | Viel | B08B 1/002 |
| 2018/0196435 A1* | 7/2018 | Kunzi et al. | G05D 1/0088 |
| 2018/0222583 A1* | 8/2018 | Parks et al. | B64C 19/00 |
| 2018/0312274 A1* | 11/2018 | Kessler et al. | B64D 47/02 |

FOREIGN PATENT DOCUMENTS

JP 2018039507 A * 3/2018 ............... B64C 39/024

* cited by examiner

*Primary Examiner* — Jelani A Smith
*Assistant Examiner* — Jacob Daniel Underbakke
(74) *Attorney, Agent, or Firm* — Athorus, PLLC

(57) ABSTRACT

Systems and methods to detect objects and associated properties may be performed by an aerial vehicle having one or more propellers and one or more microphones. The aerial vehicle may emit propeller noise patterns via the propellers during operation, and the aerial vehicle may receive echoes of the propeller noise patterns via the microphones. Based on the emitted noise patterns and received echoes, the aerial vehicle may detect objects and associated properties within an environment of the aerial vehicle. In addition, the aerial vehicle may emit encoded propeller noise patterns via the propellers during operation to communicate with other aerial vehicles, and other aerial vehicles may receive the encoded propeller noise patterns via microphones. Using such encoded propeller noise patterns, a plurality of aerial vehicles may communicate and/or coordinate operations with each other.

18 Claims, 8 Drawing Sheets

OBJECT DETECTION USING PROPELLER NOISE

BACKGROUND

Unmanned vehicles, such as unmanned aerial vehicles, automated ground vehicles, and water based automated vehicles, are continuing to increase in use. For example, aerial vehicles are often used by hobbyists to obtain aerial images of buildings, landscapes, etc. While there are many beneficial uses of these vehicles, operating and navigating aerial vehicles safely and efficiently within various environments may be challenging. To maintain safety, various object detection and avoidance systems and methods may be incorporated into aerial vehicles, such as radar systems, imaging systems, or others. However, dedicated object detection and avoidance systems may add cost, weight, and complexity to aerial vehicles. Accordingly, there is a need for systems and methods to detect objects within environments without the added cost, weight, and complexity of dedicated systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
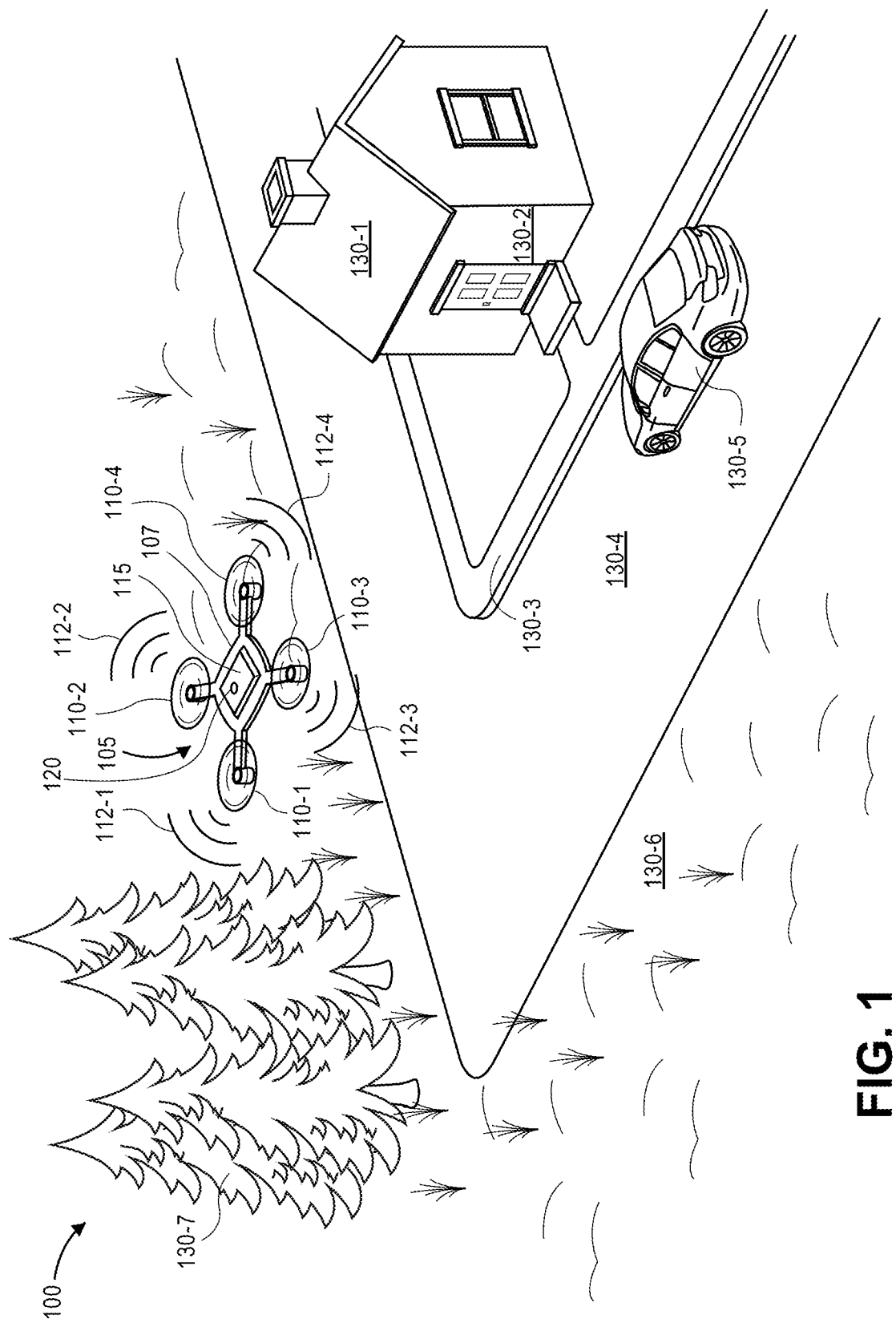
FIG. 1 is a schematic diagram of example object detection within an environment by an aerial vehicle using propeller noise, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to detect objects within an environment by an aerial vehicle are described herein. In addition, systems and methods to detect, communicate, and/or collaborate with other aerial vehicles in an environment by an aerial vehicle are described herein.

In example embodiments, an aerial vehicle may detect objects within an environment based on echoes of propeller noise emitted by the aerial vehicle that are reflected back to the aerial vehicle by objects in the environment. The propeller noise may be noise that is generated during normal operation of one or more propellers. In addition, the propeller noise may be noise that is selected for generation during operation of one or more propellers. For example, the propeller noise may be selected by modifying operational characteristics, such as rotational rates, patterns or sequences of rotational rates, pitches of blades, or other characteristics, of one or more propellers during operation. Further, the propeller noise may be selected by modifying structural characteristics, such as number of blades, pitch, span, chord length, thickness, material, surface features, or other structural characteristics, of one or more propellers. The propeller noise may be emitted by one or more propellers of the aerial vehicle and propagate into the environment around the aerial vehicle.

In additional example embodiments, an aerial vehicle may include one or more microphones or audio sensors that receive echoes of propeller noise that are reflected back to the aerial vehicle by objects in the environment. For example, one or more microphones may comprise omnidirectional microphones, directional microphones, or combinations thereof. In addition, one or more microphones may be placed at various locations on the aerial vehicle, such as on a central fuselage, frame, or body of the aerial vehicle, around a periphery of the aerial vehicle, outside airflows generated by one or more propellers, e.g., to improve the capability of the microphones to receive echoes and/or to avoid interference between emitted propeller noise and received echoes, or other locations. Further, one or more directional microphones may be oriented to receive echoes of propeller noise from various directions relative to the aerial vehicle, such as various directions pointing radially outward from the aerial vehicle, various directions above or below the aerial vehicle, or other directions.

In further example embodiments, an aerial vehicle may include one or more processors to process or analyze the received echoes of propeller noise to detect objects and/or properties of such objects within the environment of the aerial vehicle. Various properties of the received echoes, such as time of flight, frequency, amplitude, Doppler effect, or other properties, may be detected and correlated with known properties or characteristics of the emitted propeller noise, such as time of flight, frequency, amplitude, or other properties, based on known operational and/or structural characteristics of the one or more propellers that generated the propeller noise. In addition, various objects and/or properties thereof, such as shape, size, position, orientation, range, relative speed, material, surface properties, temperature, or other properties, may be detected and correlated with the various properties of the emitted propeller noise and received echoes and/or changes to such properties between the emitted propeller noise and the received echoes correlated thereto. For example, one or more processors may include one or more neural network, deep learning, or other machine learning models or algorithms that may be used to correlate various properties of emitted propeller noise and received echoes of propeller noise with various objects and/or properties of objects within the environment of the aerial vehicle.

Based on detected objects and/or properties thereof, an aerial vehicle may control, instruct, or modify its operation and navigation, e.g., to avoid the detected objects, to modify its flight plan, to land or take off safely, to adjust its speed, direction, location, altitude, or other flight parameters, or to control other aspects related to operation and navigation. In this manner, an aerial vehicle may detect objects and/or properties of objects within the environment of the aerial vehicle using one or more microphones or other audio sensors, without need for dedicated systems for object detection and avoidance that may add cost, weight, and complexity.

In other example embodiments, a first aerial vehicle may emit propeller noise that encodes data or information related to the first aerial vehicle, and a second aerial vehicle may receive the propeller noise from the first aerial vehicle and decode the data or information related to the first aerial vehicle. For example, the propeller noise from the first aerial vehicle may be selected to encode various data or information, such as vehicle identification, location, speed, direction, altitude, status, flight plan, or other information associated with the first aerial vehicle. Likewise, the second aerial vehicle may also emit propeller noise that encodes data or information related to the second aerial vehicle that may be received by the first aerial vehicle or other aerial vehicles.

Based on encoded data or information communicated between aerial vehicles, an aerial vehicle may control, instruct, or modify its operation and navigation, e.g., to avoid detected aerial vehicles, to modify its flight plan, to land or take off safely, to adjust its speed, direction, location, altitude, or other flight parameters, or to control other aspects related to operation and navigation. In this manner, a plurality of aerial vehicles may communicate and/or coordinate their operation and navigation within the environment without need for dedicated systems for communication that may add cost, weight, and complexity.

FIG. 1 is a schematic diagram 100 of example object detection within an environment by an aerial vehicle 105 using propeller noise, in accordance with disclosed implementations.

As illustrated in FIG. 1, an aerial vehicle 105 may include a frame or body 107, and a plurality of propulsion mechanisms, such as motors and propellers 110, coupled to the frame or body 107. The frame or body 107 may be formed of any suitable materials, such as carbon fiber, metals, plastics, or combinations thereof. In addition, the motors and propellers 110 may be coupled to the frame or body 107, or via one or more motor arms extending from the frame or body 107. The motors may be any suitable motors for rotating respective propellers 110 to generate thrust to lift or maneuver at least a portion of the aerial vehicle 105. The propellers 110 may be formed of any suitable materials, such as carbon fiber, metals, plastics, or combinations thereof. Further, the aerial vehicle 105 may also include a control system 115, as further described herein, that may control operation and navigation of the aerial vehicle 105, including aspects related to operation of the motors and propellers 110 to generate propeller noise.

Although FIG. 1 shows an aerial vehicle having a particular shape, size, number of motors and propellers 110-1, 110-2, 110-3, 110-4, and overall configuration, the systems and methods described herein may be utilized with aerial vehicles having various other shapes, sizes, numbers of motors and propellers, and overall configurations, such as quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In example embodiments, the aerial vehicle 105 may be navigating within an environment having various types of objects 130. For example, as shown in FIG. 1, the objects 130 may include a roof 130-1 of a building, walls 130-2 of a building, a sidewalk 130-3, a street 130-4, a ground based vehicle 130-5, a field 130-6, and trees 130-7. Various other types of objects, including fixed, static, mobile, natural, manmade, artificial, temporary, permanent, or other types of objects, obstacles, or structures, may be present in various other environments.

During operation of the aerial vehicle 105, one or more propellers 110 of the aerial vehicle may emit propeller noise 112 that propagates from the aerial vehicle 105 into the environment. For example, each of the propellers 110-1, 110-2, 110-3, 110-4 may emit respective propeller noise 112-1, 112-2, 112-3, 112-4 during operation or navigation of the aerial vehicle 105. The propeller noise 112 emitted by each propeller 110 may be substantially the same as that from one or more other propellers 110, or may be unique to each propeller 110.

The propeller noise 112 may propagate from the aerial vehicle 105 into the environment and be at least partially reflected back as echoes to the aerial vehicle 105 by objects 130 within the environment. At least a portion of the propeller noise 112 may be reflected back as echoes to the aerial vehicle 105 from one or more objects 130, and various properties of the objects 130 may affect various properties of the echoes that are reflected back to the aerial vehicle 105.

For example, a shape, size, position, orientation, range, material, surface properties, temperature, and other properties of the roof 130-1 or walls 130-2 of the building may affect properties of the propeller noise 112 that are reflected back as echoes to the aerial vehicle 105. In addition, a shape, size, position, orientation, range, material, surface properties, temperature, and other properties of the sidewalk 130-3 or street 130-4 may affect properties of the propeller noise 112 that are reflected back as echoes to the aerial vehicle 105. Further, a shape, size, position, orientation, range, relative speed, material, surface properties, temperature, and other properties of the ground based vehicle 130-5 may affect properties of the propeller noise 112 that are reflected back as echoes to the aerial vehicle 105. Moreover, a shape, size, position, orientation, range, material, surface properties, temperature, and other properties of the field 130-6 or trees 130-7 may affect properties of the propeller noise 112 that are reflected back as echoes to the aerial vehicle 105. The different objects and their different respective properties may affect properties of the echoes of emitted propeller noise 112 in different ways, such that echoes received from different objects having different respective properties may be distinguished from each other.

The aerial vehicle 105 may also include one or more microphones 120 that may receive echoes of the emitted propeller noise 112. The one more microphones or audio sensors 120 may be omnidirectional, directional, or combinations thereof, and may be placed at various locations of the aerial vehicle 105. In addition, the control system 115 of the aerial vehicle 105 may include one or more processors that may process or analyze the emitted propeller noise and the received echoes and detect objects and/or properties thereof based on the properties of the emitted propeller noise and the received echoes. As described further herein, various neural network, deep learning, or other machine learning models or algorithms may be used to correlate various properties of emitted propeller noise and received echoes of propeller noise with various objects and/or properties of objects within the environment of the aerial vehicle.

Accordingly, with incorporation of one or more microphones, the aerial vehicle 105 may be configured to detect objects and/or properties thereof and control its operation and navigation based on such detected objects and/or properties, without need for dedicated systems for object detection and avoidance that may add cost, weight, and complexity. As a result, as shown in FIG. 1, the aerial vehicle 105 may operate safely and efficiently within an environment, e.g., by identifying objects around the aerial vehicle, by avoiding collisions with objects, by navigating safely and efficiently in crowded or variable environments, by modifying its operation based on changes within the environment, and by various other controls and modifications based on detected objects and properties.

Figure 2:
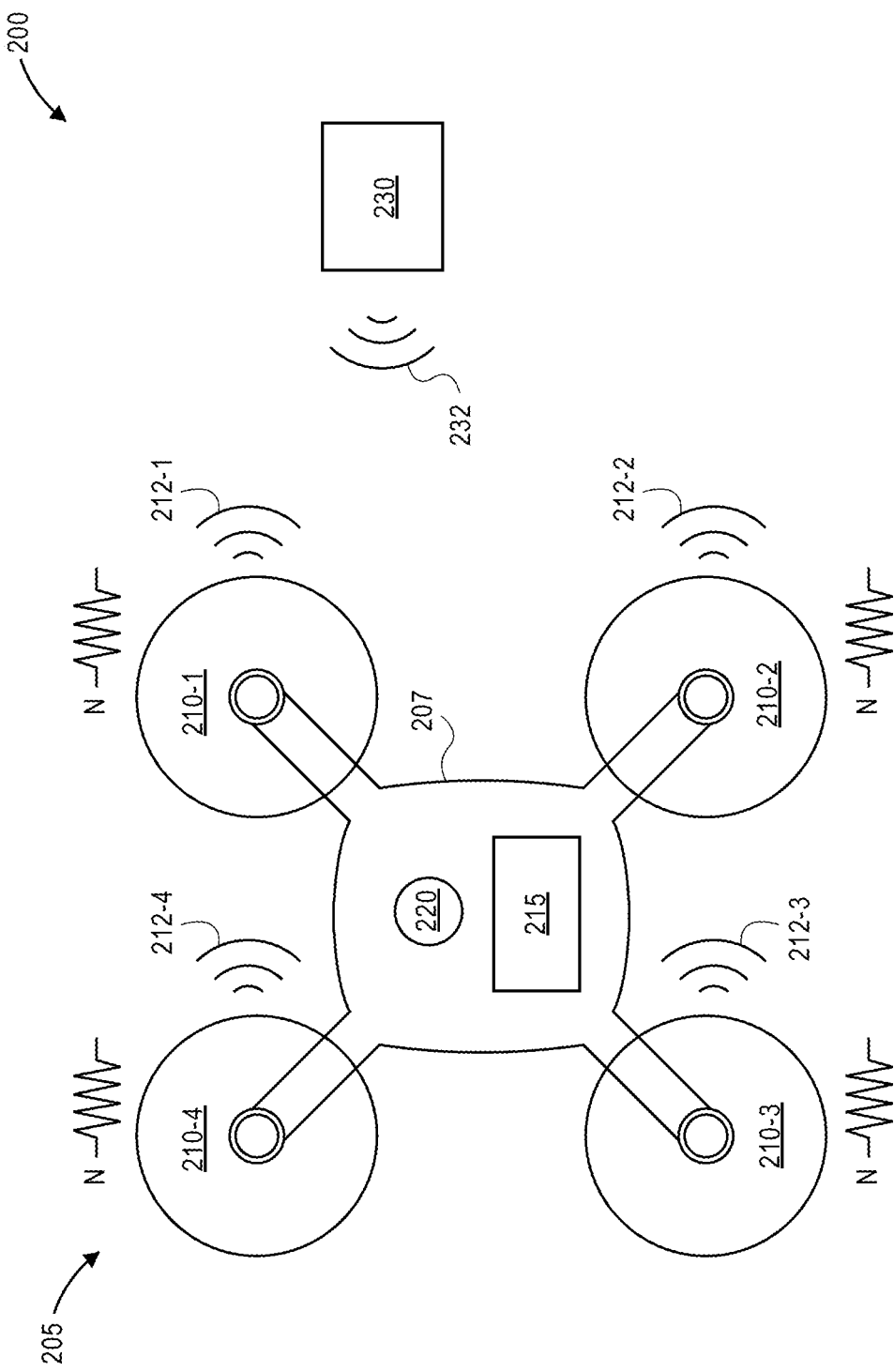
FIG. 2 is a schematic diagram of example object detection by an aerial vehicle using propeller noise patterns and one or more microphones, in accordance with disclosed implementations.

FIG. 2 is a schematic diagram 200 of example object detection by an aerial vehicle 205 using propeller noise patterns and one or more microphones, in accordance with disclosed implementations.

The aerial vehicle 205 illustrated in FIG. 2 may include any and all of the features of any of the aerial vehicles described herein. As illustrated in FIG. 2, an aerial vehicle 205 may include a frame or body 207, and a plurality of propulsion mechanisms, such as motors and propellers 210, coupled to the frame or body 207. The frame or body 207 may be formed of any suitable materials, such as carbon fiber, metals, plastics, or combinations thereof. In addition, the motors and propellers 210 may be coupled to the frame or body 207, or via one or more motor arms extending from the frame or body 207. The motors may be any suitable motors for rotating respective propellers 210 to generate thrust to lift or maneuver at least a portion of the aerial vehicle 205. The propellers 210 may be formed of any suitable materials, such as carbon fiber, metals, plastics, or combinations thereof. Further, the aerial vehicle 205 may also include a control system 215, as further described herein, that may control operation and navigation of the aerial vehicle 205, including aspects related to operation of the motors and propellers 210 to generate propeller noise.

Although FIG. 2 shows an aerial vehicle having a particular shape, size, number of motors and propellers 210-1, 210-2, 210-3, 210-4, and overall configuration, the systems and methods described herein may be utilized with aerial vehicles having various other shapes, sizes, numbers of motors and propellers, and overall configurations, such as quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

The aerial vehicle 205 may include four motors and propellers 210-1, 210-2, 210-3, 210-4, and each of the four motors and propellers 210-1, 210-2, 210-3, 210-4 may emit substantially the same propeller noise 212-1, 212-2, 212-3, 212-4 during operation or rotation of the propellers. The waveform N of the propeller noise 212 is illustrated in FIG. 2 only for exemplary purposes, and the waveform N may include various other combinations of properties, such as frequency, amplitude, patterns, sequences, or other properties. For example, the waveform N of the propeller noise 212 may depend upon operational characteristics of the propellers 210, such as rotational rates, patterns or sequences of rotational rates, pitches of blades, or other characteristics, and/or may depend upon structural characteristics of the propellers 210, such as number of blades, pitch, span, chord length, thickness, material, surface features, or other structural characteristics.

The aerial vehicle 205 may also include one or more microphones or audio sensors 220. As shown in FIG. 2, the aerial vehicle 205 may include a single, omnidirectional microphone 220 that is coupled at a central location of the frame or body 207. The omnidirectional microphone 220 may be configured to receive sound waves from substantially all directions around the omnidirectional microphone 220. In addition, the microphone 220 may be placed at a location that is outside of any airflows generated during operation of the propellers 210, e.g., to improve the capability of the microphone 220 to receive echoes of propeller noise 212 and/or to avoid interference between emitted propeller noise and received echoes.

The propeller noise 212 from one or more of the propellers 210 may propagate from the aerial vehicle 205 outward into the environment, and may be reflected back as echoes 232 from an object 230 within the environment. The object 230 may have various properties, such as shape, size, position, orientation, range, relative speed, material, surface properties, temperature, and other properties, and the echoes 232 of the propeller noise 212 may have various properties or changes to properties, such as frequency, amplitude, Doppler effect, patterns, sequences, or other properties, that may correspond to various properties of the object 230.

In the example embodiment of FIG. 2, because each of the propellers 210 emits substantially the same waveform N of propeller noise 212, echoes 232 that may be reflected back by an object 230 and received by the microphone 220 may not be able to be distinguished with respect to the particular propeller 210 and associated propeller noise 212 that resulted in the received echo 232 reflected back by the object 230. In addition, because the aerial vehicle includes a single, omnidirectional microphone 220, echoes 232 that may be reflected back by an object 230 and received by the microphone 220 may not be able to be distinguished with respect to a particular location or direction of the object 230 by which the echo 232 was reflected back relative to a position or orientation of the aerial vehicle 205.

Nonetheless, various objects 230 and/or properties thereof may be detected based on the echoes 232 reflected back and received by the microphone 220 of the aerial vehicle 205. For example, if the time of emission of the propeller noise 212 is known, a range to the object 230 that reflected back the echo 232 may be determined based on the time of flight of the propeller noise 212 and corresponding echo 232. In addition, a shape or size of the object 230 that reflected back the echo 232 may be determined based on changes to frequency, amplitude, Doppler effect, patterns, sequences, or other properties of the echo 232 relative to the propeller noise 212. Further, a relative speed of the object 230 that reflected back the echo 232 may be determined based on changes to frequency, period, patterns, sequences, or other properties of the echo 232 relative to the propeller noise 212. Moreover, material, surface properties, or temperature of the object 230 that reflected back the echo 232 may be determined based on changes to frequency, amplitude, Doppler effect, patterns, sequences, or other properties of the echo 232 relative to the propeller noise 212.

In addition, although FIG. 2 illustrates each of the propellers 210 emitting substantially the same propeller noise 212, in other example embodiments, less than all or only one of the propellers 210 may be selected and operated to generate propeller noise 212 that may be reflected back by objects within the environment and received by the microphone 220 of the aerial vehicle 205. Further, the selection of one or more propellers 210 to generate propeller noise 212 may be dependent upon current operations or navigation of the aerial vehicle 205, such that propeller noise 212 may be generated by one or more propellers 210 without detrimentally affecting the operation or navigation of the aerial vehicle 205, e.g., thrust or lift required for various flight maneuvers. In still further example embodiments, propeller noise may be generated by an aerial vehicle 205 while the aerial vehicle is on the ground, e.g., before takeoff or after landing, and in such example embodiments, the operational characteristics of the propellers that may be modified may further include cycling one or more propellers on and off, and/or larger changes in rotational rates and/or pitches of one or more propellers, and/or the structural characteristics of the propellers may be modified to a greater extent or in different manners, since maintaining flight or navigation of the aerial vehicle may not be a concern when the aerial vehicle is on the ground.

Figure 3:
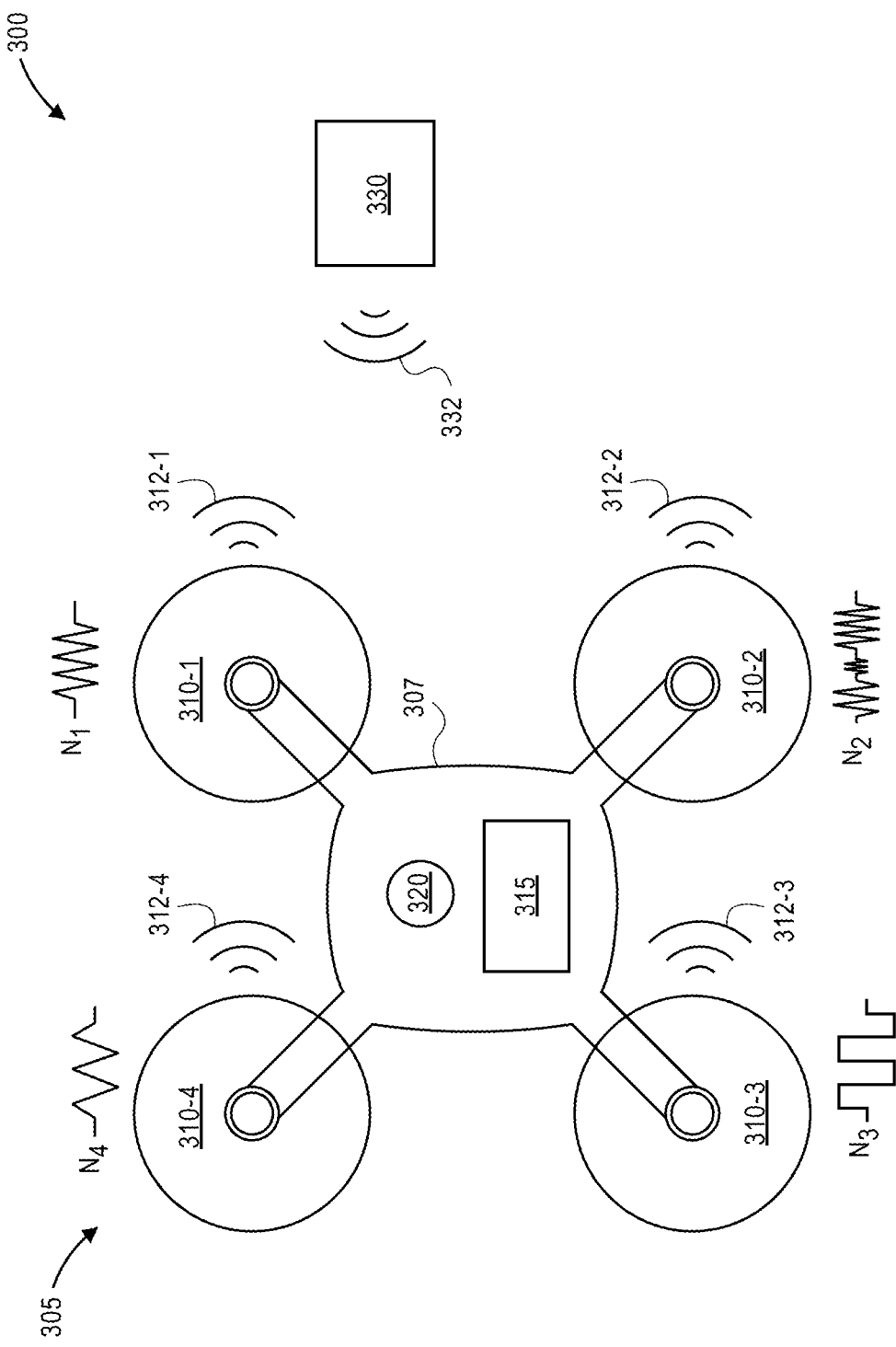
FIG. 3 is a schematic diagram of another example object detection by an aerial vehicle using one or more propeller noise patterns and one or more microphones, in accordance with disclosed implementations.

FIG. 3 is a schematic diagram 300 of another example object detection by an aerial vehicle 305 using one or more propeller noise patterns and one or more microphones, in accordance with disclosed implementations.

The aerial vehicle 305 illustrated in FIG. 3 may include any and all of the features of any of the aerial vehicles described herein. As illustrated in FIG. 3, an aerial vehicle 305 may include a frame or body 307, and a plurality of propulsion mechanisms, such as motors and propellers 310, coupled to the frame or body 307. The frame or body 307 may be formed of any suitable materials, such as carbon fiber, metals, plastics, or combinations thereof. In addition, the motors and propellers 310 may be coupled to the frame or body 307, or via one or more motor arms extending from the frame or body 307. The motors may be any suitable motors for rotating respective propellers 310 to generate thrust to lift or maneuver at least a portion of the aerial vehicle 305. The propellers 310 may be formed of any suitable materials, such as carbon fiber, metals, plastics, or combinations thereof. Further, the aerial vehicle 305 may also include a control system 315, as further described herein, that may control operation and navigation of the aerial vehicle 305, including aspects related to operation of the motors and propellers 310 to generate propeller noise.

Although FIG. 3 shows an aerial vehicle having a particular shape, size, number of motors and propellers 310-1, 310-2, 310-3, 310-4, and overall configuration, the systems and methods described herein may be utilized with aerial vehicles having various other shapes, sizes, numbers of motors and propellers, and overall configurations, such as quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

The aerial vehicle 305 may include four motors and propellers 310-1, 310-2, 310-3, 310-4, and each of the four motors and propellers 310-1, 310-2, 310-3, 310-4 may emit propeller noise 312-1, 312-2, 312-3, 312-4 different from that emitted by any other propeller 310 during operation or rotation of the propellers. The waveforms $N_1$, $N_2$, $N_3$, $N_4$ of the propeller noise 312 are illustrated in FIG. 3 only for exemplary purposes, and the waveforms N may include various other combinations of properties, such as frequency, amplitude, patterns, sequences, or other properties. For example, the waveforms N of the propeller noise 312 may depend upon operational characteristics of the propellers 310, such as rotational rates, patterns or sequences of rotational rates, pitches of blades, or other characteristics, and/or may depend upon structural characteristics of the propellers 310, such as number of blades, pitch, span, chord length, thickness, material, surface features, or other structural characteristics.

In some example embodiments, operational characteristics of one or more propellers 310 may be modified during operation in order to generate particular waveforms N of propeller noise 312. For example, a rotational rate and/or pitches of one or more blades of a propeller 310 may be modified during operation or navigation of the aerial vehicle 305 to generate a particular waveform N while maintaining flight and operation of the aerial vehicle 305. In additional example embodiments, structural characteristics of one or more propellers 310 may be modified during operation in order to generate particular waveforms N of propeller noise 312. For example, if a propeller 310 and/or one or more blades of a propeller 310 are designed to be adjustable, a pitch, span, chord length, thickness, or surface features, such as dimples, grooves, protrusions, control surfaces, ailerons, or other surface features, may be modified during operation or navigation of the aerial vehicle 305 to generate a particular waveform N while maintaining flight and operation of the aerial vehicle 305. In other example embodiments, a propeller 310 and/or one or more blades of a propeller 310 may be designed or configured with particular structural characteristics, such as number of blades, pitch, span, chord length, thickness, material, surface features, or other structural characteristics, that will affect the particular waveform N generated by the propeller 310 during operation. In this manner, one or more of the propellers 310 may be configured to generate particular waveforms N of propeller noise 312 that may be distinct from propeller noise 312 generated by one or more other propellers 310.

The aerial vehicle 305 may also include one or more microphones or audio sensors 320. As shown in FIG. 3, the aerial vehicle 305 may include a single, omnidirectional microphone 320 that is coupled at a central location of the frame or body 307. The omnidirectional microphone 320 may be configured to receive sound waves from substantially all directions around the omnidirectional microphone 320. In addition, the microphone 320 may be placed at a location that is outside of any airflows generated during operation of the propellers 310, e.g., to improve the capability of the microphone 320 to receive echoes of propeller noise 312 and/or to avoid interference between emitted propeller noise and received echoes.

The propeller noise 312 from one or more of the propellers 310 may propagate from the aerial vehicle 305 outward into the environment, and may be reflected back as echoes 332 from an object 330 within the environment. The object 330 may have various properties, such as shape, size, position, orientation, range, relative speed, material, surface properties, temperature, and other properties, and the echoes 332 of the propeller noise 312 may have various properties or changes to properties, such as frequency, amplitude, Doppler effect, patterns, sequences, or other properties, that may correspond to various properties of the object 330.

In the example embodiment of FIG. 3, because each of the propellers 310 may emit a particular waveform $N_1$, $N_2$, $N_3$, $N_4$ of the propeller noise 312 that may be distinct from those generated by other propellers 310, echoes 332 that may be reflected back by an object 330 and received by the microphone 320 may be able to be distinguished with respect to the particular propeller 310 and associated propeller noise 312 that resulted in the received echo 332 reflected back by the object 330. In addition, similar to the example described with respect to FIG. 2, because the aerial vehicle includes a single, omnidirectional microphone 320, echoes 332 that may be reflected back by an object 330 and received by the microphone 320 may not be able to be distinguished with respect to a particular location or direction of the object 330 by which the echo 332 was reflected back relative to a position or orientation of the aerial vehicle 305.

However, because each of the propellers 310 may emit a particular waveform $N_1$, $N_2$, $N_3$, $N_4$ of the propeller noise 312 that may be distinct from those generated by other propellers 310, the particular times of flight of different waveforms N that are received as echoes 332 by the microphone 320 may be used to triangulate a location or direction of the object 330 by which the echoes 332 were reflected back relative to a position or orientation of the aerial vehicle 305. For example, as illustrated in FIG. 3, if waveforms $N_1$, $N_3$, and $N_4$ of propeller noise 312 are emitted by the propellers 310-1, 310-3, and 310-4 at substantially the same time, and if echoes 332 reflected back by object 330 of each of the waveforms $N_1$, $N_3$, and $N_4$ of propeller noise 312 are received by the microphone at different times, e.g., the time of flight of waveform $N_1$ and its associated echo is shorter than the time of flight of waveform $N_4$ and its associated echo, which is shorter than the time of flight of waveform $N_3$ and its associated echo, then it may be determined with an increased level of confidence that each of the waveforms $N_1$, $N_3$, and $N_4$ was reflected back from a single object that is at a location similar to the location of object 330 shown in FIG. 3.

Furthermore, various objects 330 and/or properties thereof may be detected based on the echoes 332 reflected back and received by the microphone 320 of the aerial vehicle 305. For example, if the time of emission of the propeller noise 312 is known, a range to the object 330 that reflected back the echo 332 may be determined based on the time of flight of the propeller noise 312 and corresponding echo 332. In addition, a shape or size of the object 330 that reflected back the echo 332 may be determined based on changes to frequency, amplitude, Doppler effect, patterns, sequences, or other properties of the echo 332 relative to the propeller noise 312. Further, a relative speed of the object 330 that reflected back the echo 332 may be determined based on changes to frequency, period, patterns, sequences, or other properties of the echo 332 relative to the propeller noise 312. Moreover, material, surface properties, or temperature of the object 330 that reflected back the echo 332 may be determined based on changes to frequency, amplitude, Doppler effect, patterns, sequences, or other properties of the echo 332 relative to the propeller noise 312.

In addition, although FIG. 3 illustrates each of the propellers 310 emitting a unique waveform N of propeller noise 312, in other example embodiments, less than all or only one of the propellers 310 may be selected and operated to generate a particular waveform N of propeller noise 312 that may be reflected back by objects within the environment and received by the microphone 320 of the aerial vehicle 305. Further, the selection of one or more propellers 310 to generate particular waveforms N of propeller noise 312 may be dependent upon current operations or navigation of the aerial vehicle 305, such that waveforms N of propeller noise 312 may be generated by one or more propellers 310 without detrimentally affecting the operation or navigation of the aerial vehicle 305, e.g., thrust or lift required for various flight maneuvers. In still further example embodiments, one or more waveforms N of propeller noise may be generated by an aerial vehicle 305 while the aerial vehicle is on the ground, e.g., before takeoff or after landing, and in such example embodiments, the operational characteristics of the propellers that may be modified may further include cycling one or more propellers on and off, and/or larger changes in rotational rates and/or pitches of one or more propellers, and/or the structural characteristics of the propellers may be modified to a greater extent or in different manners, since maintaining flight or navigation of the aerial vehicle may not be a concern when the aerial vehicle is on the ground.

Figure 4:
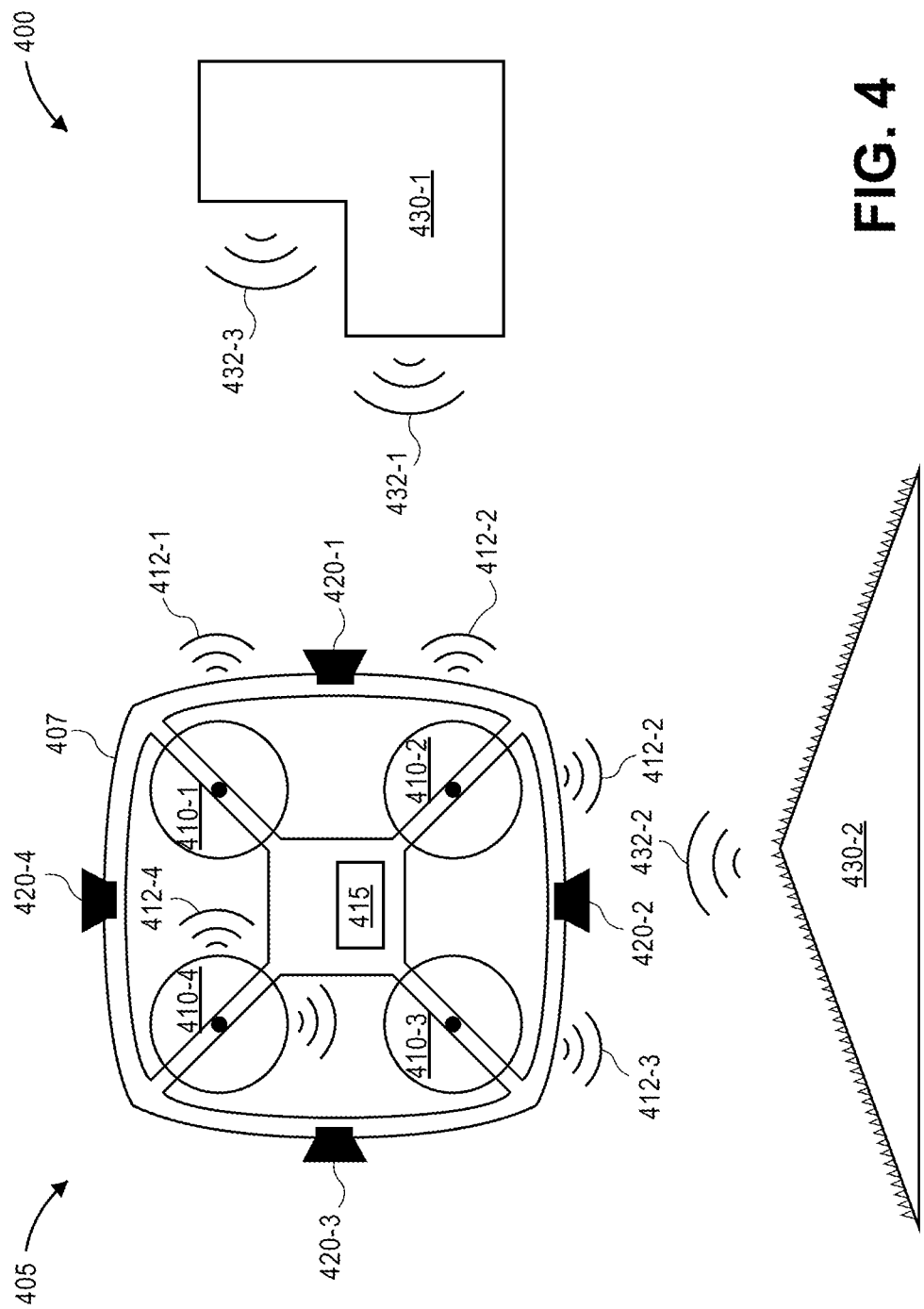
FIG. 4 is a schematic diagram of yet another example object detection by an aerial vehicle using one or more propeller noise patterns and one or more microphones, in accordance with disclosed implementations.

FIG. 4 is a schematic diagram 400 of yet another example object detection by an aerial vehicle 405 using one or more propeller noise patterns and one or more microphones, in accordance with disclosed implementations.

The aerial vehicle 405 illustrated in FIG. 4 may include any and all of the features of any of the aerial vehicles described herein. As illustrated in FIG. 4, an aerial vehicle 405 may include a frame or body 407, and a plurality of propulsion mechanisms, such as motors and propellers 410, coupled to the frame or body 407. The frame or body 407 may be formed of any suitable materials, such as carbon fiber, metals, plastics, or combinations thereof. Further, the frame or body 407 may extend at least partially around an outer periphery of the aerial vehicle 405. In addition, the motors and propellers 410 may be coupled to the frame or body 407, or via one or more motor arms extending from the frame or body 407. The motors may be any suitable motors for rotating respective propellers 410 to generate thrust to lift or maneuver at least a portion of the aerial vehicle 405. The propellers 410 may be formed of any suitable materials, such as carbon fiber, metals, plastics, or combinations thereof. Further, the aerial vehicle 405 may also include a control system 415, as further described herein, that may control operation and navigation of the aerial vehicle 405, including aspects related to operation of the motors and propellers 410 to generate propeller noise.

Although FIG. 4 shows an aerial vehicle having a particular shape, size, number of motors and propellers 410-1, 410-2, 410-3, 410-4, and overall configuration, the systems and methods described herein may be utilized with aerial vehicles having various other shapes, sizes, numbers of motors and propellers, and overall configurations, such as quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

The aerial vehicle 405 may include four motors and propellers 410-1, 410-2, 410-3, 410-4, and each of the four motors and propellers 410-1, 410-2, 410-3, 410-4 may emit propeller noise 412-1, 412-2, 412-3, 412-4 that may be the same or different from that emitted by any other propeller 410 during operation or rotation of the propellers. The waveforms of the propeller noise 412 may include various combinations of properties, such as frequency, amplitude, patterns, sequences, or other properties. For example, the waveforms of the propeller noise 412 may depend upon operational characteristics of the propellers 410, such as rotational rates, patterns or sequences of rotational rates, pitches of blades, or other characteristics, and/or may depend upon structural characteristics of the propellers 410, such as number of blades, pitch, span, chord length, thickness, material, surface features, or other structural characteristics.

In some example embodiments, operational characteristics of one or more propellers 410 may be modified during operation in order to generate particular waveforms of propeller noise 412. For example, a rotational rate and/or pitches of one or more blades of a propeller 410 may be modified during operation or navigation of the aerial vehicle 405 to generate a particular waveform while maintaining flight and operation of the aerial vehicle 405. In additional example embodiments, structural characteristics of one or more propellers 410 may be modified during operation in order to generate particular waveforms of propeller noise 412. For example, if a propeller 410 and/or one or more blades of a propeller 410 are designed to be adjustable, a pitch, span, chord length, thickness, or surface features, such as dimples, grooves, protrusions, control surfaces, ailerons, or other surface features, may be modified during operation or navigation of the aerial vehicle 405 to generate a particular waveform while maintaining flight and operation of the aerial vehicle 405. In other example embodiments, a propeller 410 and/or one or more blades of a propeller 410 may be designed or configured with particular structural characteristics, such as number of blades, pitch, span, chord length, thickness, material, surface features, or other structural characteristics, that will affect the particular waveform generated by the propeller 410 during operation. In this manner, one or more of the propellers 410 may be configured to generate particular waveforms of propeller noise 412 that may be the same as or distinct from propeller noise 412 generated by one or more other propellers 410.

The aerial vehicle 405 may also include one or more microphones or audio sensors 420. As shown in FIG. 4, the aerial vehicle 405 may include a plurality of directional microphones 420-1, 420-2, 420-3, 420-4 that are coupled at various locations of the frame or body 407. For example, the directional microphones 420 may be coupled around an outer periphery of the aerial vehicle 405 and may each be configured to receive sound waves from a particular direction relative to the aerial vehicle 405. In addition, the directional microphones 420 may be placed at locations that are outside of any airflows generated during operation of the propellers 410, e.g., to improve the capability of the microphones 420 to receive echoes of propeller noise 412 and/or to avoid interference between emitted propeller noise and received echoes. In other example embodiments, one or more directional microphones 420 may be coupled to the aerial vehicle 405 at various other locations on the aerial vehicle 405 and may be configured to receive sound waves from various other directions, such as above, below, or in other directions, relative to the aerial vehicle 405.

The propeller noise 412 from one or more of the propellers 410 may propagate from the aerial vehicle 405 outward into the environment, and may be reflected back as echoes 432 from one or more objects 430 within the environment. The objects 430-1, 430-2 may have various properties, such as shape, size, position, orientation, range, relative speed, material, surface properties, temperature, and other properties, and the echoes 432-1, 432-2, 432-3 of the propeller noise 412 may have various properties or changes to properties, such as frequency, amplitude, Doppler effect, patterns, sequences, or other properties, that may correspond to various properties of the objects 430-1, 430-2.

In the example embodiment of FIG. 4, because each of the directional microphones 420 is oriented to receive sounds waves from different directions, a location or position of an object 430 relative to the aerial vehicle 405 may be determined based on the particular microphone 420 that receives the echoes 432. For example, directional microphone 420-1 may receive echoes 432-1, 432-3 that are reflected back by object 430-1, and it may be determined that the object 430-1 is at a particular location or position relative to the aerial vehicle 405 based on the directionality of the microphone 420-1. Likewise, directional microphone 420-2 may receive echoes 432-2 that are reflected back by object 430-2, and it may be determined that the object 430-2 is at a particular location or position relative to the aerial vehicle 405 based on the directionality of the microphone 420-2.

Further, because each of the propellers 410 may emit a particular waveform of the propeller noise 412 that may be distinct from those generated by other propellers 410, echoes 432 that may be reflected back by an object 430 and received by one or more microphones 420 may be able to be distinguished with respect to the particular propeller 410 and associated propeller noise 412 that resulted in the received echo 432 reflected back by the object 430.

In addition, because each of the propellers 410 may emit a particular waveform of the propeller noise 412 that may be distinct from those generated by other propellers 410, the particular times of flight of different waveforms that are received as echoes 432 by the one or more microphones 420 may be used to further triangulate a location or direction of the object 430 by which the echoes 432 were reflected back relative to a position or orientation of the aerial vehicle 405. For example, as illustrated in FIG. 4, if propeller noise 412-1, 412-4 is emitted by the propellers 410-1 and 410-4 at substantially the same time, and if echoes 432-1 reflected back by object 430-1 of each of the waveforms of propeller noise 412-1, 412-4 are received by the directional microphone 420-1 at different times, e.g., the time of flight of propeller noise 412-1 and its associated echo is shorter than the time of flight of propeller noise 412-4 and its associated echo, then it may be determined with an increased level of confidence that each of the waveforms of propeller noise 412-1, 412-4 was reflected back from a single object that is at a location similar to the location of object 430-1 shown in FIG. 3.

Furthermore, various objects 430 and/or properties thereof may be detected based on the echoes 432 reflected back and received by the one or more microphones 420 of the aerial vehicle 405. For example, if the time of emission of the propeller noise 412 is known, a range to the object 430 that reflected back the echo 432 may be determined based on the time of flight of the propeller noise 412 and corresponding echo 432. In addition, a shape or size of the object 430 that reflected back the echo 432 may be determined based on changes to frequency, amplitude, Doppler effect, patterns, sequences, or other properties of the echo 432 relative to the propeller noise 412. For example, as shown in FIG. 4, the shape or size of object 430-1 may be determined based on multiple echoes 432-1, 432-3 received by the microphone 420-1, as well as based on changes to frequency, amplitude, Doppler effect, patterns, sequences, or other properties of the echoes 432-1, 432-3 relative to the propeller noise 412. Further, a relative speed of the object 430 that reflected back the echo 432 may be determined based on changes to frequency, period, Doppler effect, patterns, sequences, or other properties of the echo 432 relative to the propeller noise 412. Moreover, material, surface properties, or temperature of the object 430 that reflected back the echo 432 may be determined based on changes to frequency, amplitude, Doppler effect, patterns, sequences, or other properties of the echo 432 relative to the propeller noise 412. For example, as shown in FIG. 4, the material or surface properties of the object 430-2 may be determined based on changes to frequency, amplitude, Doppler effect, patterns, sequences, or other properties of the echo 432-2 relative to the propeller noise 412.

Various neural network, deep learning, or other machine learning models and algorithms, such as recurrent neural networks, may be used to process the received echoes of propeller noise and detect one or more objects and/or properties thereof. As described herein, propeller noise emitted by a propeller may include various properties, such as frequency, amplitude, patterns, sequences, or other properties. In addition, echoes of propeller noise reflected back by objects and received by microphones may also include various properties, such as frequency, amplitude, Doppler effect, patterns, sequences, or other properties, and/or changes to various properties with respect to properties of the emitted propeller noise. Further, objects that may reflect back echoes of propeller noise may also include various properties, such as shape, size, position, orientation, range, relative speed, material, surface properties, temperature, or other properties, that may alter or affect the properties of propeller noise that is reflected back as echoes by the objects. Various machine learning models and algorithms may be trained using emitted propeller noise having various properties, objects having various properties, and received echoes of propeller noise having various properties, in order to train such models and algorithms to identify objects and/or properties thereof based on properties of emitted propeller noise and properties of received echoes of propeller noise. Moreover, in addition to properties or changes to properties of propeller noise and echoes, changes over time to properties or changes to properties of propeller noise and echoes may also be included to train such models and algorithms to identify objects and/or properties thereof, such as changes to properties due to movement, due to changes to relative speeds, due to changes to temperatures or other environmental factors, or due to other changes over time.

In addition, although FIG. 4 illustrates each of the propellers 410 emitting a waveform of propeller noise 412, in other example embodiments, less than all or only one of the propellers 410 may be selected and operated to generate a particular waveform of propeller noise 412 that may be reflected back by objects within the environment and received by the one or more microphones 420 of the aerial vehicle 405. Further, the selection of one or more propellers 410 to generate particular waveforms of propeller noise 412 may be dependent upon current operations or navigation of the aerial vehicle 405, such that waveforms of propeller noise 412 may be generated by one or more propellers 410 without detrimentally affecting the operation or navigation of the aerial vehicle 405, e.g., thrust or lift required for various flight maneuvers. In still further example embodiments, one or more waveforms of propeller noise may be generated by an aerial vehicle 405 while the aerial vehicle is on the ground, e.g., before takeoff or after landing, and in such example embodiments, the operational characteristics of the propellers that may be modified may further include cycling one or more propellers on and off, and/or larger changes in rotational rates and/or pitches of one or more propellers, and/or the structural characteristics of the propellers may be modified to a greater extent or in different manners, since maintaining flight or navigation of the aerial vehicle may not be a concern when the aerial vehicle is on the ground.

Furthermore, any of the microphones or audio sensors described herein, including both omnidirectional and directional microphones, may be configured or tuned to receive sound waves in one or more desired frequency ranges. For example, during normal operation of an aerial vehicle, particular frequencies or ranges of frequencies may be substantially saturated with sound waves, such that it may be difficult to identify or filter echoes of propeller noise of interest from other noise generated by the aerial vehicle, other vehicles, the environment, or other noise sources. Accordingly, the microphones or audio sensors may be configured or tuned to receive sound waves in one or more desired frequency ranges, whether audible to the human ear or not, that may be less saturated with noise from other noise sources, such that echoes of propeller noise may be more effectively identified and utilized for object detection as described herein. In further example embodiments, the received sound waves may be filtered or processed by one or more processors to identify or isolate one or more desired frequency ranges, even if the microphones or audio sensors may not necessarily be configured or tuned for particular desired frequency ranges.

Moreover, operation of one or more microphones or audio sensors may be cycled on and off as desired, e.g., based on commands or instructions from a control system, in order to more effectively receive echoes of propeller noise of interest. For example, during emission of particular waveforms of propeller noise, the one or more microphones or audio sensors may be cycled off to avoid receiving propeller noise as it is emitted and propagates away from the aerial vehicle. Further, the one or more microphones or audio sensors may be cycled on to receive echoes of propeller noise at particular desired times, e.g., if some information related to the environment of the aerial vehicle is already known. Moreover, the one or more microphones or audio sensors may also be cycled off to avoid receiving echoes of propeller noise at particular desired times, e.g., if some information related to the environment of the aerial vehicle is already known such as location of the ground, or locations of other known objects within the environment.

In further example embodiments, one or more microphones or audio sensors may be operated or configured to detect emitted noise patterns and received echoes at substantially the same time. For example, an emitted noise pattern and a received echo that may be received by an audio sensor at substantially the same time may exhibit a particular interference pattern between the noise pattern and the echo. Based on the particular interference pattern that is detected, one or more objects or properties thereof may be identified within the environment of the aerial vehicle, using the various processing methods and techniques described herein. For example, various machine learning models and algorithms may be trained using emitted noise having various properties, objects having various properties, received echoes of noise having various properties, and/or interference patterns having various properties, in order to train such models and algorithms to identify objects and/or properties thereof based on properties of emitted noise, properties of received echoes of noise, and/or properties of interference patterns.

Figure 5:
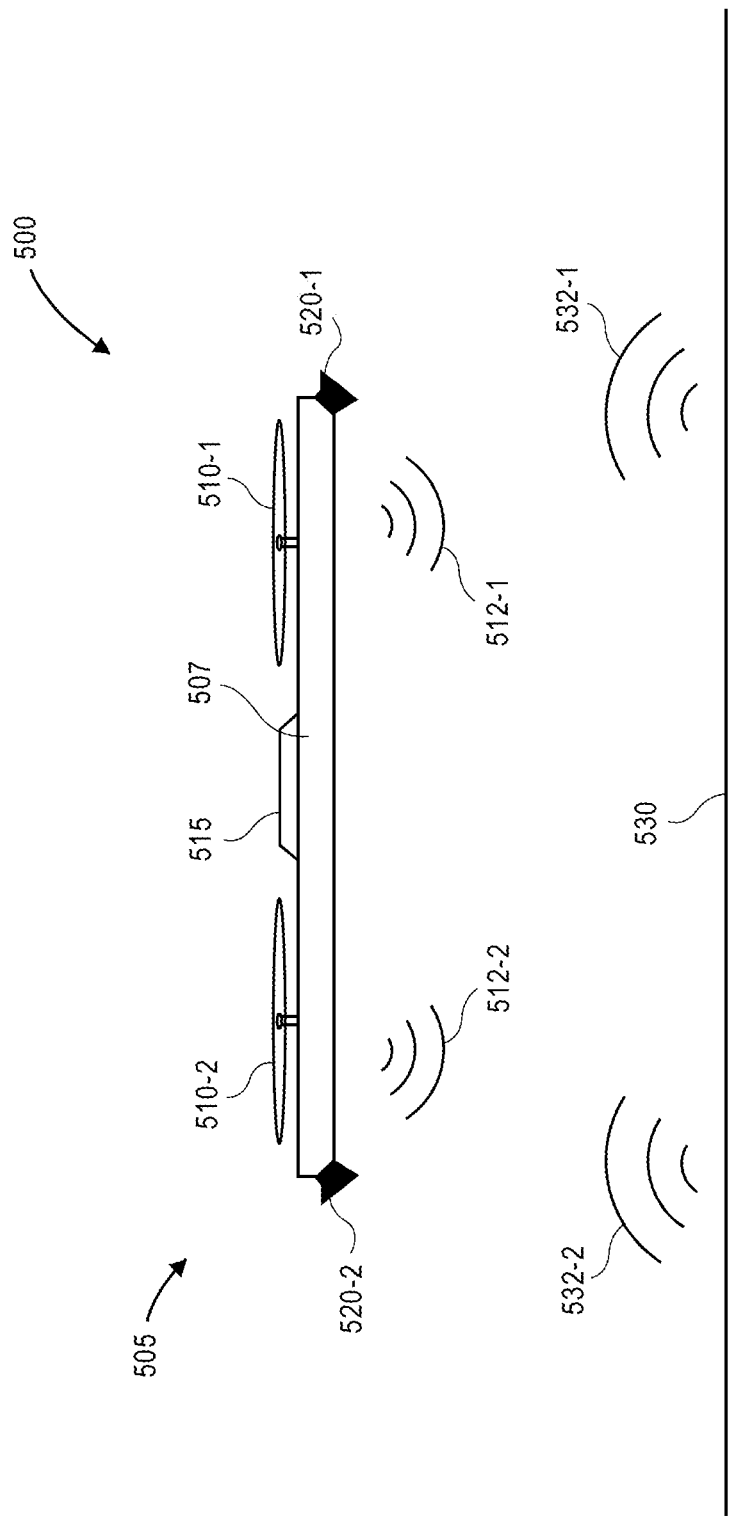
FIG. 5 is a schematic diagram of still another example object and structure detection by an aerial vehicle using one or more propeller noise patterns and one or more microphones, in accordance with disclosed implementations.

FIG. 5 is a schematic diagram 500 of still another example object and structure detection by an aerial vehicle 505 using one or more propeller noise patterns and one or more microphones, in accordance with disclosed implementations.

The aerial vehicle 505 illustrated in FIG. 5 may include any and all of the features of any of the aerial vehicles described herein. As illustrated in FIG. 5, an aerial vehicle 505 may include a frame or body 507, and a plurality of propulsion mechanisms, such as motors and propellers 510, coupled to the frame or body 507. The frame or body 507 may be formed of any suitable materials, such as carbon fiber, metals, plastics, or combinations thereof. Further, the frame or body 507 may extend at least partially around an outer periphery of the aerial vehicle 505. In addition, the motors and propellers 510 may be coupled to the frame or body 507, or via one or more motor arms extending from the frame or body 507. The motors may be any suitable motors for rotating respective propellers 510 to generate thrust to lift or maneuver at least a portion of the aerial vehicle 505. The propellers 510 may be formed of any suitable materials, such as carbon fiber, metals, plastics, or combinations thereof. Further, the aerial vehicle 505 may also include a control system 515, as further described herein, that may control operation and navigation of the aerial vehicle 505, including aspects related to operation of the motors and propellers 510 to generate propeller noise.

Although FIG. 5 shows an aerial vehicle having a particular shape, size, number of motors and propellers 510-1, 510-2, and overall configuration, the systems and methods described herein may be utilized with aerial vehicles having various other shapes, sizes, numbers of motors and propellers, and overall configurations, such as quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

The aerial vehicle 505 may include a plurality of motors and propellers 510-1, 510-2 (only two being shown), and each of the plurality of motors and propellers 510-1, 510-2 may emit propeller noise 512-1, 512-2 that may be the same or different from that emitted by any other propeller 510 during operation or rotation of the propellers. The waveforms of the propeller noise 512 may include various combinations of properties, such as frequency, amplitude, patterns, sequences, or other properties. For example, the waveforms of the propeller noise 512 may depend upon operational characteristics of the propellers 510, such as rotational rates, patterns or sequences of rotational rates, pitches of blades, or other characteristics, and/or may depend upon structural characteristics of the propellers 510, such as number of blades, pitch, span, chord length, thickness, material, surface features, or other structural characteristics.

The aerial vehicle 505 may also include one or more microphones or audio sensors 520. As shown in FIG. 5, the aerial vehicle 505 may include a plurality of directional microphones 520-1, 520-2 (only two being shown) that are coupled at various locations of the frame or body 507. For example, the directional microphones 520 may be coupled around an outer periphery of the aerial vehicle 505 and may each be configured to receive sound waves from a particular direction relative to the aerial vehicle 505. In addition, the directional microphones 520 may be placed at locations that are outside of any airflows generated during operation of the propellers 510, e.g., to improve the capability of the microphones 520 to receive echoes of propeller noise 512 and/or to avoid interference between emitted propeller noise and received echoes. In other example embodiments, one or more directional microphones 520 may be coupled to the aerial vehicle 505 at various other locations on the aerial vehicle 505 and may be configured to receive sound waves from various other directions, such as above, below, or in other directions, relative to the aerial vehicle 505.

As shown in FIG. 5, the propeller noise 512-1, 512-2 from one or more of the propellers 510-1, 510-2 may propagate from the aerial vehicle 505 outward into the environment, and may be reflected back as echoes 532-1, 532-2 from one or more objects 530 within the environment, such as the ground. The ground may have various properties, such as shape, size, position, orientation, range, material, surface properties, temperature, and other properties, and the echoes 532-1, 532-2 of the propeller noise 512-1, 512-2 may have various properties or changes to properties, such as frequency, amplitude, Doppler effect, patterns, sequences, or other properties, that may correspond to various properties of the ground.

The aerial vehicle 505 may also include various other types of sensors, such as location sensors, global positioning sensors, indoor positioning sensors, radar, LIDAR, altitude sensors, pressure sensors, temperature sensors, imaging sensors, ultrasonic sensors, or various other types of sensors. In addition, the aerial vehicle 505 may also include data or information, or have access to data or information, related to the environment and known objects and/or properties of such known objects within the environment. Based on a combination of such additional data or information, as well as data associated with various of the other types of sensors that may be included on the aerial vehicle, the aerial vehicle may use echoes of propeller noise received by one or more microphones to corroborate or validate data or information from other sources. For example, echoes of propeller noise received from the ground may be used to corroborate or validate data received from location sensors or altitude sensors with respect to the distance of the aerial vehicle from the ground. In addition, echoes of propeller noise received from other known objects may be used to corroborate or validate data received from radar, LIDAR, or imaging sensors with respect to locations of other known objects within the environment. In some examples, the one or more microphones or audio sensors may be cycled off to avoid receiving echoes of propeller noise at particular desired times that are associated with the location of the ground relative to the aerial vehicle. In further examples, the one or more microphones or audio sensors may also be cycled off to avoid receiving echoes of propeller noise at particular desired times that are associated locations of other known objects within the environment for which the operation or navigation of the aerial vehicle is already accounting. In this manner, the aerial vehicle may receive echoes of propeller noise that may be associated with particular objects of interest, such as unknown objects, moving objects, variable objects, temporary objects, or various other types of objects.

In addition, although FIG. 5 illustrates each of the propellers 510 emitting a waveform of propeller noise 512, in other example embodiments, less than all or only one of the propellers 510 may be selected and operated to generate a particular waveform of propeller noise 512 that may be reflected back by objects within the environment and received by the one or more microphones 520 of the aerial vehicle 505. Further, the selection of one or more propellers 510 to generate particular waveforms of propeller noise 512 may be dependent upon current operations or navigation of the aerial vehicle 505, such that waveforms of propeller noise 512 may be generated by one or more propellers 510 without detrimentally affecting the operation or navigation of the aerial vehicle 505, e.g., thrust or lift required for various flight maneuvers. In still further example embodiments, one or more waveforms of propeller noise may be generated by an aerial vehicle 505 while the aerial vehicle is on the ground, e.g., before takeoff or after landing, and in such example embodiments, the operational characteristics of the propellers that may be modified may further include cycling one or more propellers on and off, and/or larger changes in rotational rates and/or pitches of one or more propellers, and/or the structural characteristics of the propellers may be modified to a greater extent or in different manners, since maintaining flight or navigation of the aerial vehicle may not be a concern when the aerial vehicle is on the ground.

Figure 6:
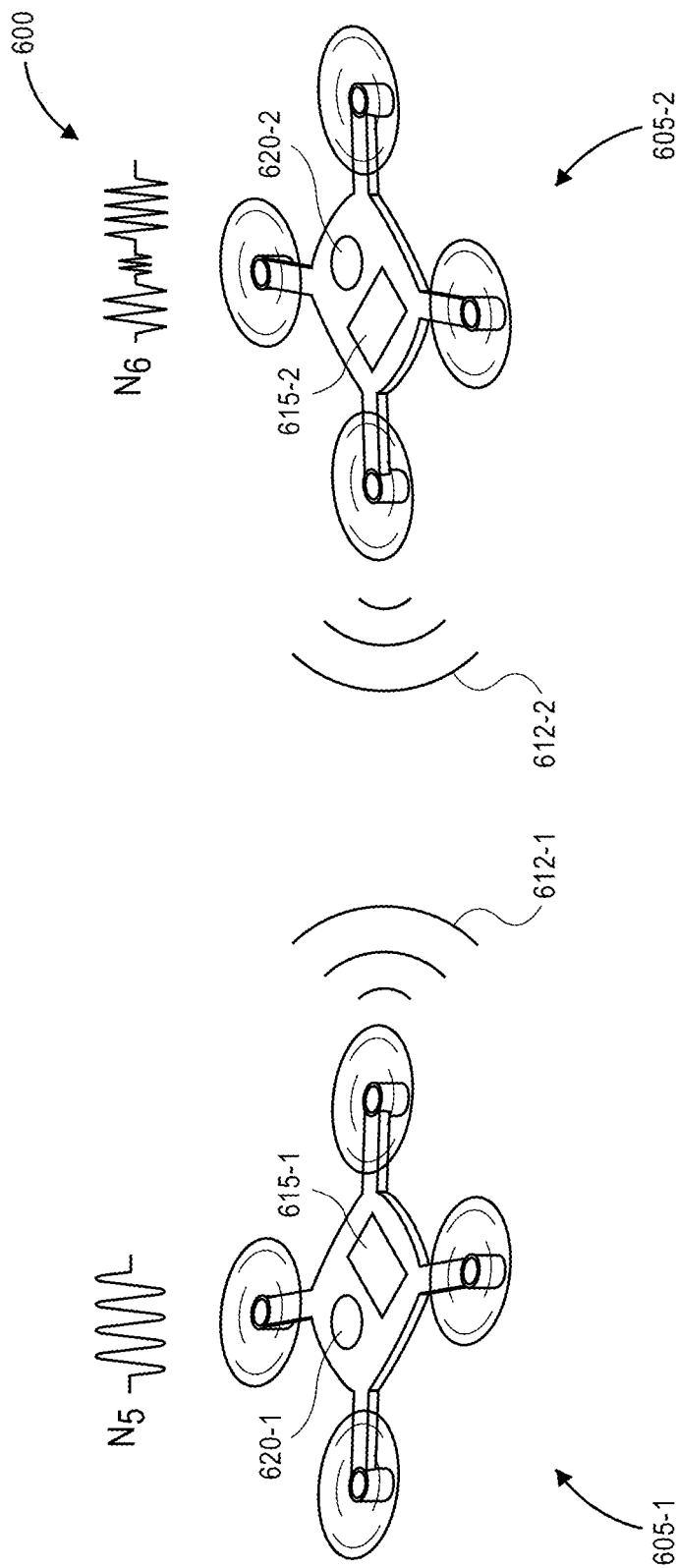
FIG. 6 is a schematic diagram of example aerial vehicle detection by aerial vehicles using one or more propeller noise patterns and one or more microphones, in accordance with disclosed implementations.

FIG. 6 is a schematic diagram 600 of example aerial vehicle detection by aerial vehicles 605-1, 605-2 using one or more propeller noise patterns and one or more microphones, in accordance with disclosed implementations.

The aerial vehicles 605-1, 605-2 illustrated in FIG. 6 may include any and all of the features of any of the aerial vehicles described herein. As illustrated in FIG. 6, each of the aerial vehicles 605-1, 605-2 may include a frame or body, and a plurality of propulsion mechanisms, such as motors and propellers, coupled to the frame or body. The frame or body may be formed of any suitable materials, such as carbon fiber, metals, plastics, or combinations thereof. In addition, the motors and propellers may be coupled to the frame or body, or via one or more motor arms extending from the frame or body. The motors may be any suitable motors for rotating respective propellers to generate thrust to lift or maneuver at least a portion of the aerial vehicles. The propellers may be formed of any suitable materials, such as carbon fiber, metals, plastics, or combinations thereof. Further, the aerial vehicles may also include control systems 615-1, 615-2, as further described herein, that may control operation and navigation of the aerial vehicles 605-1, 605-2, including aspects related to operation of the motors and propellers to generate propeller noise.

Although FIG. 6 shows aerial vehicles having a particular shape, size, number of motors and propellers, and overall configuration, the systems and methods described herein may be utilized with aerial vehicles having various other shapes, sizes, numbers of motors and propellers, and overall configurations, such as quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In the example embodiment shown in FIG. 6, the aerial vehicles 605-1, 605-2 may include four motors and propellers, and one or more of the four motors and propellers may emit propeller noise 612-1, 612-2 that may be the same or different from that emitted by any other propeller during operation or rotation of the propellers. The waveforms $N_5$, $N_6$ of the propeller noise 612-1, 612-2 may include various combinations of properties, such as frequency, amplitude, patterns, sequences, or other properties. For example, the waveforms $N_5$, $N_6$ of the propeller noise 612 may depend upon operational characteristics of the propellers, such as rotational rates, patterns or sequences of rotational rates, pitches of blades, or other characteristics, and/or may depend upon structural characteristics of the propellers, such as number of blades, pitch, span, chord length, thickness, material, surface features, or other structural characteristics.

In some example embodiments, operational characteristics of one or more propellers may be modified during operation in order to generate particular waveforms $N_5$, $N_6$ of propeller noise 612-1, 612-2. For example, a rotational rate and/or pitches of one or more blades of a propeller may be modified during operation or navigation of the aerial vehicles to generate particular waveforms $N_5$, $N_6$ while maintaining flight and operation of the aerial vehicles. In additional example embodiments, structural characteristics of one or more propellers may be modified during operation in order to generate particular waveforms $N_5$, $N_6$ of propeller noise 612-1, 612-2. For example, if a propeller and/or one or more blades of a propeller are designed to be adjustable, a pitch, span, chord length, thickness, or surface features, such as dimples, grooves, protrusions, control surfaces, ailerons, or other surface features, may be modified during operation or navigation of the aerial vehicles to generate particular waveforms $N_5$, $N_6$ while maintaining flight and operation of the aerial vehicles. In other example embodiments, a propeller and/or one or more blades of a propeller may be designed or configured with particular structural characteristics, such as number of blades, pitch, span, chord length, thickness, material, surface features, or other structural characteristics, that will affect the particular waveform $N_5$, $N_6$ generated by the propeller during operation. In this manner, one or more of the propellers may be configured to generate particular waveforms $N_5$, $N_6$ of propeller noise 612-1, 612-2 that may be distinct from propeller noise generated by one or more other propellers.

The aerial vehicles 605-1, 605-2 may also include one or more microphones or audio sensors 620-1, 620-2. As shown in FIG. 6, the aerial vehicles 605-1, 605-2 may include single, omnidirectional microphones 620-1, 620-2 that are coupled at a central location of the frame or body. The omnidirectional microphones 620-1, 620-2 may be configured to receive sound waves from substantially all directions around the omnidirectional microphones 620-1, 620-2. Alternatively or in addition, the aerial vehicles 605-1, 605-2 may include a plurality of directional microphones that are coupled at various locations of the frame or body. For example, the directional microphones may be coupled around an outer periphery of the aerial vehicles and may each be configured to receive sound waves from a particular direction relative to the aerial vehicles 605-1, 605-2. In addition, the one or more microphones may be placed at locations that are outside of any airflows generated during operation of the propellers, e.g., to improve the capability of the microphones to receive echoes of propeller noise and/or to avoid interference between emitted propeller noise and received echoes.

As shown in FIG. 6, the propeller noise 612-1, 612-2 generated by one or more of the propellers of each aerial vehicle 605-1, 605-2 may propagate from the aerial vehicles 605-1, 605-2 outward into the environment. In addition, the waveforms $N_5$, $N_6$ of the propeller noise 612-1, 612-2 generated by each aerial vehicle 605-1, 605-2 may encode various types of data or information related to the aerial vehicle, such as vehicle identification, location, speed, direction, altitude, status, flight plan, or other information. In some examples, the data or information related to the aerial vehicle may be encoded using one or more defined communication protocols in which various properties, or combinations of properties, within waveforms of propeller noise may be associated with particular data or information. In other examples, the data or information related to the aerial vehicle may be encoded and stored in a lookup table, database, or other memory, either local or remote, that associates particular data or information of the aerial vehicle with particular waveforms of propeller noise.

In additional example embodiments, one or more propellers of aerial vehicles may provide the same or different encoded data or information over time, e.g., emitting a first waveform of propeller noise associated with a vehicle identification from a first propeller, and then emitting a second waveform of propeller noise associated with a vehicle status or flight plan from the first propeller or from a different propeller, or other combinations of encoded data or information emitted over time. In further example embodiments, a plurality of propellers of aerial vehicles may provide the same or different encoded data or information at the same time or during overlapping periods of time, e.g., emitting a first waveform of propeller noise associated with a vehicle identification from a first propeller at a first time, and emitting a second waveform of propeller noise associated with a vehicle location, speed, direction, or altitude from a second propeller at a second time that at least partially overlaps the first time, or other combinations of encoded data or information emitted over at least partially overlapping periods of time.

In addition, although FIG. 6 illustrates various propellers of aerial vehicles emitting waveforms of propeller noise, in other example embodiments, less than all or only one of the propellers may be selected and operated to generate particular waveforms of propeller noise that may be emitted for communication purposes within the environment and received by one or more microphones of one or more other aerial vehicles. Further, the selection of one or more propellers to generate particular waveforms of propeller noise may be dependent upon current operations or navigation of the aerial vehicles, such that waveforms of propeller noise may be generated by one or more propellers without detrimentally affecting the operation or navigation of the aerial vehicles, e.g., thrust or lift required for various flight maneuvers. In still further example embodiments, one or more waveforms of propeller noise may be generated by aerial vehicles while the aerial vehicles are on the ground, e.g., before takeoff or after landing, and in such example embodiments, the operational characteristics of the propellers that may be modified may further include cycling one or more propellers on and off, and/or larger changes in rotational rates and/or pitches of one or more propellers, and/or the structural characteristics of the propellers may be modified to a greater extent or in different manners, since maintaining flight or navigation of the aerial vehicles may not be a concern when the aerial vehicles are on the ground.

Accordingly, with incorporation of one or more microphones, the aerial vehicles may be configured to communicate data or information with other aerial vehicles, and control and/or coordinate their operation and navigation based on such data or information from other aerial vehicles, without need for dedicated systems for communication that may add cost, weight, and complexity. As a result, a plurality of aerial vehicles may operate safely and efficiently within an environment, e.g., by identifying other aerial vehicles around the aerial vehicle, by collaborating operations with other aerial vehicles, by avoiding collisions with other aerial vehicles, by navigating safely and efficiently in crowded or variable environments, by modifying operation based on changes to other aerial vehicles within the environment, and by various other controls and modifications based on detected aerial vehicles and data or information associated therewith.

Figure 7:
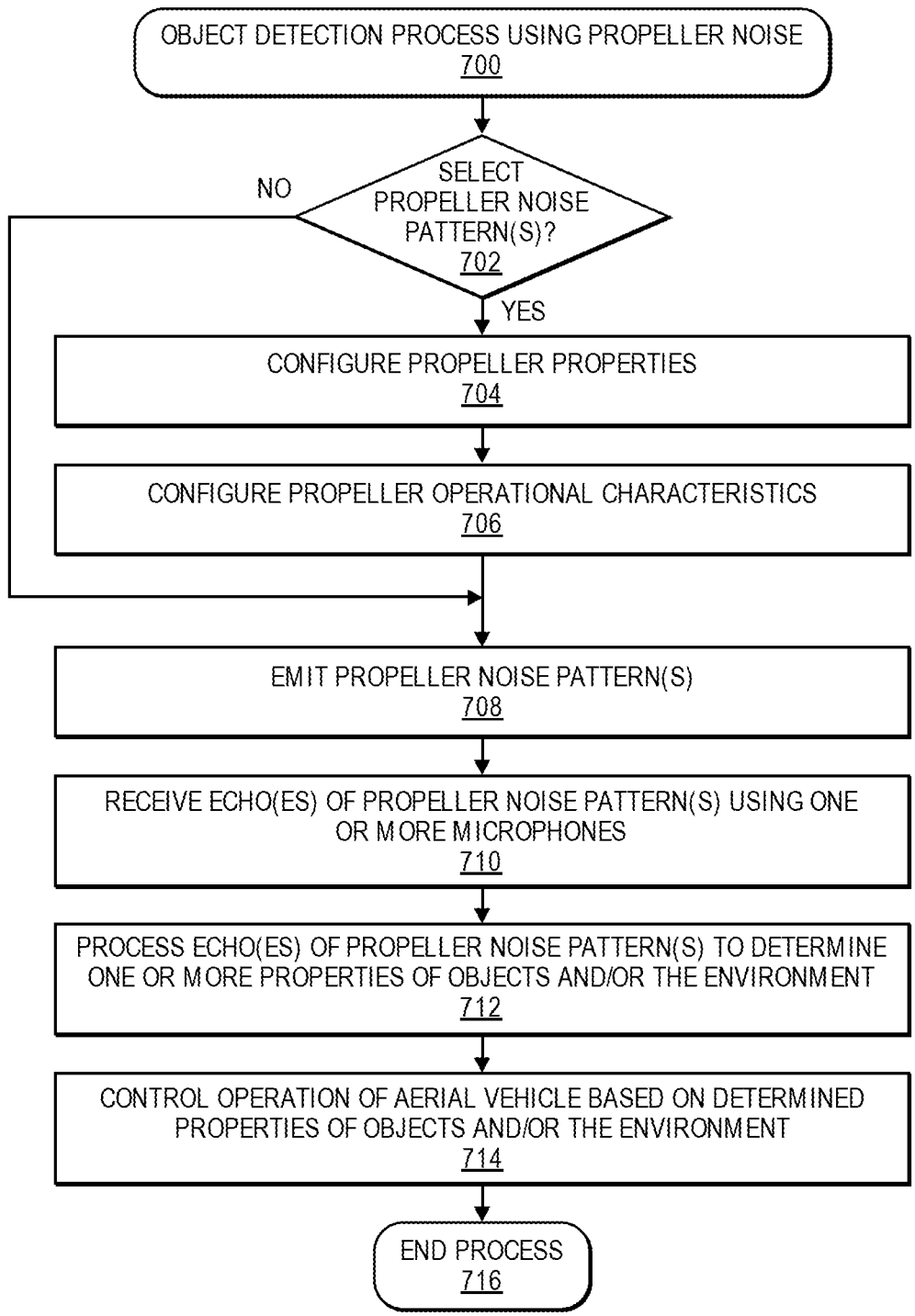
FIG. 7 is a flow diagram illustrating an example object detection process using propeller noise, in accordance with disclosed implementations.

FIG. 7 is a flow diagram illustrating an example object detection process using propeller noise 700, in accordance with disclosed implementations.

The process 700 may begin by determining whether to select one or more propeller noise patterns, as at 702. For example, one or more propeller noise patterns may be emitted by one or more propellers in order to detect objects and/or properties thereof within an environment of an aerial vehicle. Alternatively, one or more propeller noise patterns may be emitted by one or more propellers in order to communicate and/or coordinate operations with one or more other aerial vehicles within an environment of an aerial vehicle.

If it is determined that one or more propeller noise patterns are to be selected, then the process 700 may proceed to configure one or more propeller properties or characteristics, as at 704. For example, various structural properties or characteristics, such as number of blades, pitch, span, chord length, thickness, material, surface features, or other structural characteristics, of one or more propellers of an aerial vehicle may be modified to emit propeller noise having particular waveforms. The process 700 may also continue to configure one or more propeller operational characteristics, as at 706. For example, various operational characteristics, such as rotational rates, patterns or sequences of rotational rates, pitches of blades, or other characteristics, of one or more propellers of an aerial vehicle may be modified to emit propeller noise having particular waveforms.

After selecting one or more propeller noise patterns and configuring one or more propeller structural properties or operational characteristics, as at 702, 704, 706, and/or after determining that one or more propeller noise patterns are not to be selected, as at 702, then the process 700 may proceed to emit one or more propeller noise patterns, as at 708. For example, the emitted propeller noise patterns may be those that are selected for one or more propellers based on modifications to structural and/or operational characteristics. Alternatively, the emitted propeller noise patterns may be those that are already emitted by one or more propellers during normal operation of an aerial vehicle. In addition, the propeller noise patterns may have various properties, such as frequency, period, amplitude, patterns, sequences, or other properties. Further, the propeller noise patterns may be emitted continuously, intermittently, at one or more particular frequencies, or only at specific desired times.

The process 700 may then continue to receive one or more echoes of the one or more propeller noise patterns using one or more microphones, as at 710. For example, the one or more propeller noise patterns may be at least partially reflected back as one or more echoes by one or more objects within the environment. In addition, an aerial vehicle may include various types of microphones, including omnidirectional or directional microphones, that may receive one or more of the echoes reflected back by one or more objects. Further, the one or more echoes may have various properties, such as frequency, period, amplitude, Doppler effect, patterns, sequences, or other properties, and/or changes to such properties, in comparison to corresponding properties of the emitted propeller noise patterns that resulted in the echoes.

Further, the process 700 may proceed by processing the one or more echoes of propeller noise patterns to determine one or more properties of objects and/or the environment, as at 712. For example, the properties of the emitted propeller noise patterns and the properties of the echoes corresponding to the emitted propeller noise patterns may be processed or analyzed to detect objects within the environment of an aerial vehicle, as well as various properties associated with such detected objects within the environment. The various properties may include additional data related to the detected objects, such as shape, size, position, orientation, range, relative speed, material, surface properties, temperature, and other properties. In some example embodiments, one or more machine learning models or algorithms may be trained with data associated with propeller noise patterns, data associated with echoes, and data associated with objects and properties thereof, such that one or more objects and associated properties may be detected based on the emitted propeller noise patterns and received echoes.

The process 700 may then continue by controlling operation of an aerial vehicle based on the determined properties of objects and/or the environment, as at 714. For example, based on the detected objects and associated properties, an aerial vehicle may be controlled, instructed, or commanded to operate or navigate, or to modify its operation or navigation, in a variety of ways. In some examples, an aerial vehicle may be instructed to avoid a detected object, an aerial vehicle may be instructed to modify its flight plan, an aerial vehicle may be instructed to land or take off, an aerial vehicle may be instructed to alter its speed, direction, location, or altitude, an aerial vehicle may be instructed to maintain a safe distance from a detected object, an aerial vehicle may be instructed to emit additional noise patterns to determine additional properties of the object, or an aerial vehicle may be instructed with various other actions or modifications to its operation.

In example embodiments in which an aerial vehicle is communicating and/or coordinating its operation with one or more different aerial vehicles via emitted propeller noise patterns, the process 700 may include alternative steps of receiving, using one or more microphones, one or more propeller noise patterns emitted from a different aerial vehicle, processing the received propeller noise patterns to determine one or more properties associated with the different aerial vehicle, and controlling operation of an aerial vehicle based on the determined properties of the different aerial vehicle. For example, the propeller noise patterns may encode various data or information associated with the different aerial vehicle, including vehicle identification, location, speed, direction, altitude, status, flight plan, or other information. In addition, the received propeller noise patterns may be processed or analyzed to decode the encoded data or information associated with the different aerial vehicle. Further, an aerial vehicle may be instructed or commanded to operate or navigate based on the decoded data or information of the different aerial vehicle.

For example, based on the detected different aerial vehicle and associated data or information, an aerial vehicle may be controlled, instructed, or commanded to operate or navigate, or to modify its operation or navigation, in a variety of ways. In some examples, an aerial vehicle may be instructed to avoid a detected different aerial vehicle, an aerial vehicle may be instructed to modify its flight plan, an aerial vehicle may be instructed to land or take off, an aerial vehicle may be instructed to alter its speed, direction, location, or altitude, an aerial vehicle may be instructed to maintain a safe distance from a detected different aerial vehicle, an aerial vehicle may be instructed to emit propeller noise patterns to enable two-way communication between the aerial vehicle and the different aerial vehicle, an aerial vehicle may be instructed to coordinate its operation or navigation with that of the different aerial vehicle, or an aerial vehicle may be instructed with various other actions or modifications to its operation based on the detected different aerial vehicle. Moreover, although the discussion herein refers to two aerial vehicles that may communicate and/or coordinate their operations, the systems and methods herein may be used to enable communication and/or coordination of operations of a plurality of aerial vehicles.

In addition or alternatively to controlling operation of one or more aerial vehicles based on determined properties of one or more objects, obstacles, structures, aerial vehicles, other vehicles, or other objects within the environment, in other example embodiments, various other actions may be taken based on the determined one or more objects or properties thereof. For example, maps or models of one or more environments may be generated, modified, or updated based on determined objects and properties thereof, e.g., to facilitate aerial vehicle operations and navigation within such environments. In addition, information related to determined objects and properties thereof may be processed to understand changes to one or more environments, to maintain or inspect one or more buildings, structures, or other objects, to monitor various natural environments, or to achieve various other purposes.

Furthermore, an aerial vehicle may emit propeller noise patterns and receive echoes to detect objects and properties thereof within an environment, and at the same time, or during at least partially overlapping times, the aerial vehicle may also emit and/or receive propeller noise patterns to communicate and/or coordinate operations with one or more other aerial vehicles within the environment, such that operation or navigation of an aerial vehicle may be instructed based on a combination of both detected objects and properties thereof within the environment and also detected aerial vehicles and data associated therewith within the environment.

Figure 8:
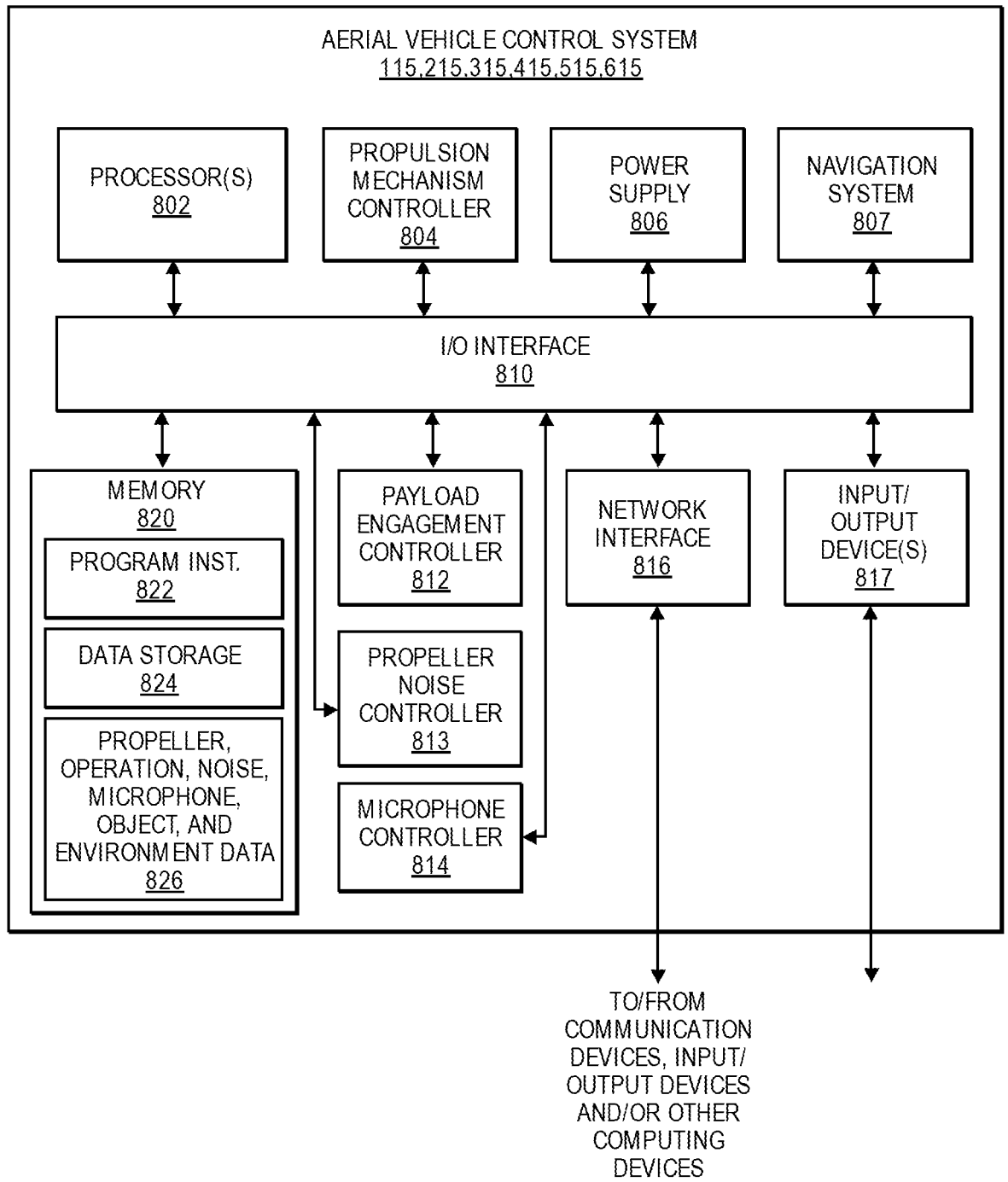
FIG. 8 is a block diagram illustrating various components of an example aerial vehicle control system, in accordance with disclosed implementations.

FIG. 8 is a block diagram illustrating various components of an example aerial vehicle control system 115, 215, 315, 415, 515, 615, in accordance with disclosed implementations.

In various examples, the block diagram may be illustrative of one or more aspects of the aerial vehicle control system that may be used to implement the various systems and methods discussed herein and/or to control operation of an aerial vehicle discussed herein. In the illustrated implementation, the aerial vehicle control system includes one or more processors 802, coupled to a memory, e.g., a non-transitory computer readable storage medium 820, via an input/output (I/O) interface 810. The aerial vehicle control system also includes propulsion mechanism controllers 804, such as electronic speed controls (ESCs) or motor controllers, power supplies or modules 806, and/or a navigation system 807. The aerial vehicle control system further includes a payload engagement controller 812, a propeller noise controller 813, a microphone controller 814, a network interface 816, and one or more input/output devices 817.

In various implementations, the aerial vehicle control system may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, propeller data, operational characteristics data, noise pattern data, microphone data, object data and properties thereof, environment data, and/or other data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824 and other data 826, respectively. In other implementations, program instructions, data, and/or other data may be received, sent, or stored upon different types of computer-accessible media, such as non-transitory media, or on similar media separate from the non-transitory computer readable storage medium 820 or the aerial vehicle control system. Generally speaking, a non-transitory, computer readable storage medium may include storage media or memory media such as magnetic or optical media, e.g., disk or CD/DVD-ROM, coupled to the aerial vehicle control system via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 817. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The propulsion mechanism controllers 804 may communicate with the navigation system 807 and adjust the rotational rate, position, orientation, blade pitch, or other parameters of each propulsion mechanism to emit one or more propeller noise patterns, to implement one or more aerial vehicle flight plans or operations, and/or to perform one or more maneuvers and guide the aerial vehicle along a flight path and/or to a destination location. Although the description herein generally refers to motors and propellers that generate propeller noise patterns that may be reflected back by one or more objects as echoes, in other example embodiments, aerial vehicles may include other types of propulsion mechanisms, such as fans, jets, turbojets, turbo fans, jet engines, electric jets, and/or combinations thereof, that may also generate noise patterns that may be reflected back by one or more objects as echoes. In addition, one or more operational and/or structural characteristics of various other types of propulsion mechanisms may also be modified to select and generate particular noise patterns.

The navigation system 807 may include a global positioning system (GPS), indoor positioning system (IPS), or other similar system and/or sensors that can be used to navigate the aerial vehicle to and/or from a location. The payload engagement controller 812 communicates with the actuator(s) or motor(s) (e.g., a servo motor) used to engage and/or disengage items.

The propeller noise controller 813 may select or determine one or more propeller noise patterns, such as one or more particular waveforms, that may be generated and emitted by one or more propellers of the aerial vehicle. As described herein, the propeller noise patterns may be selected based at least in part on current or expected operation or navigation of the aerial vehicle, so as not to detrimentally affect such operation or navigation of the aerial vehicle, particularly if structural properties or characteristics and/or operational characteristics of one or more propellers are to be modified to generate the determined propeller noise patterns.

The microphone controller 814 may control operation of one or more microphones configured to receive echoes of emitted propeller noise patterns and/or propeller noise patterns emitted by other vehicles. As described herein, the operation of the one or more microphones may be cycled on and off as desired to receive echoes or noise patterns at desired times, or to not receive echoes or noise patterns at particular times. Moreover, the operation of the one or more microphones may be configured or tuned to receive echoes and/or noise patterns within one or more desired ranges of frequency, so as to more reliably receive, distinguish, or identify such echoes and/or noise patterns from other propeller noise due to normal operation, other noise sources, or other ambient noise within an environment.

The network interface 816 may be configured to allow data to be exchanged between the aerial vehicle control system, other devices attached to a network, such as other computer systems (e.g., remote computing resources), and/or with aerial vehicle control systems of other aerial vehicles. For example, the network interface 816 may enable wireless communication between the aerial vehicle and an aerial vehicle control system that is implemented on one or more remote computing resources. For wireless communication, an antenna of the aerial vehicle or other communication components may be utilized. As another example, the network interface 816 may enable wireless communication between numerous aerial vehicles. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 817 may, in some implementations, include one or more displays, imaging devices, thermal sensors, infrared sensors, time of flight sensors, accelerometers, pressure sensors, weather sensors, various other sensors described herein, etc. Multiple input/output devices 817 may be present and controlled by the aerial vehicle control system. One or more of these sensors may be utilized to control functions or operations related to selecting or determining propeller noise patterns, emitting propeller noise patterns, receiving echoes and/or noise patterns, processing echoes and/or noise patterns to detect objects, vehicles, and properties thereof, controlling or instructing operations of an aerial vehicle based on detected objects, vehicles, and properties thereof, and/or any other operations or functions described herein.

As shown in FIG. 8, the memory may include program instructions 822, which may be configured to implement the example routines and/or sub-routines described herein. The data storage 824 or other data 826 may include various data stores for maintaining data items that may be provided for operations and navigation of an aerial vehicle, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 115, 215, 315, 415, 515, 615 is merely illustrative and is not intended to limit the scope of the present disclosure. In particular, the computing system and devices may include any combination of hardware or software that can perform the indicated functions. The aerial vehicle control system may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system may be transmitted to the aerial vehicle control system via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and control systems should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to detect objects, comprising:
   selecting respective noise patterns to be emitted by respective propellers of a plurality of propellers rotated by respective motors during operation of an aerial vehicle;
   instructing rotation of the plurality of propellers including a first propeller and a second propeller;
   causing emission of the respective noise patterns based on the rotation of the plurality of propellers, the respective noise patterns including a first noise pattern based on the rotation of the first propeller and a second noise pattern based on the rotation of the second propeller;
   receiving, using at least one microphone, a first echo of the first noise pattern of the respective noise patterns reflected by an object within an environment of the aerial vehicle;
   processing the first echo to determine at least one first property associated with the object; and
   receiving, using the at least one microphone, a second echo of the second noise pattern of the respective noise patterns reflected by the object within the environment of the aerial vehicle;
   processing the second echo to determine at least one second property associated with the object; and
   modifying the operation of the aerial vehicle based at least in part on the at least one first property and the at least one second property associated with the object.

2. The computer-implemented method of claim 1, wherein selecting respective noise patterns further comprises at least one of:
   modifying at least one operational characteristic of respective propellers; or
   modifying at least one structural characteristic of respective propellers.

3. The computer-implemented method of claim 2, wherein the at least one operational characteristic comprises at least one of a rotational rate, a plurality of rotational rates, or a pitch.

4. The computer-implemented method of claim 2, wherein the at least one structural characteristic comprises at least one of a number of blades, pitch, span, chord length, thickness, material, or surface features.

5. The computer-implemented method of claim 1, wherein the at least one first property associated with the object comprises at least one of a shape, size, position, orientation, range, relative speed, material, surface properties, or temperature.

6. A method, comprising:
   selecting a noise pattern to be emitted during operation of a propulsion mechanism;
   causing emission of the noise pattern based on the operation of the propulsion mechanism of an aerial vehicle;
   receiving, using at least one audio sensor, an echo of the noise pattern reflected by an object within an environment of the aerial vehicle;
   processing the echo to determine at least one property associated with the object;
   instructing operation of a second propulsion mechanism of the aerial vehicle;
   causing emission of a second noise pattern based on the operation of the second propulsion mechanism;
   receiving, using the at least one audio sensor, a second echo of the second noise pattern reflected by the object within the environment of the aerial vehicle; and
   processing the second echo to determine at least one second property associated with the object.

7. The method of claim 6, wherein the noise pattern is selected by modifying at least one of an operational characteristic or a structural characteristic of the propulsion mechanism.

8. The method of claim 7, wherein the operational characteristic comprises a plurality of rotational rates; and
   wherein the noise pattern is emitted based on the operation of the propulsion mechanism comprising the plurality of rotational rates.

9. The method of claim 6, further comprising at least one of:
   instructing operation of the aerial vehicle based at least in part on the at least one property associated with the object; or
   generating a model of the environment based at least in part on the at least one property associated with the object.

10. The method of claim 9, wherein instructing the operation of the aerial vehicle based at least in part on the at least one property associated with the object further comprises modifying at least one of a speed, direction, location, or altitude of the aerial vehicle.

11. The method of claim 6, wherein the at least one audio sensor comprises at least one of:
    an omnidirectional audio sensor that is configured to receive echoes from a plurality of directions relative to the aerial vehicle; or
    a plurality of directional audio sensors, each directional audio sensor configured to receive echoes from a respective direction relative to the aerial vehicle.

12. The method of claim 6, wherein the at least one audio sensor is coupled to the aerial vehicle outside an airflow generated during the operation of the propulsion mechanism.

13. The method of claim 6, wherein the at least one audio sensor is configured to detect a desired frequency range of the echo.

14. The method of claim 6, wherein the at least one property associated with the object comprises at least one of a shape, size, position, orientation, range, relative speed, material, surface properties, or temperature.

15. The method of claim 6, further comprising:
    instructing operation of a third propulsion mechanism of the aerial vehicle;
    causing emission of a third noise pattern based on the operation of the third propulsion mechanism;
    receiving, using the at least one audio sensor, a third echo of the third noise pattern reflected by a second object within the environment of the aerial vehicle; and
    processing the third echo to determine at least one third property associated with the second object.

16. A communication method, comprising:
    selecting a first noise pattern to be emitted during operation of a first propulsion mechanism of a first aerial vehicle;
    selecting a second noise pattern to be emitted during operation of the first propulsion mechanism of the first aerial vehicle;
    instructing operation of the first propulsion mechanism of the first aerial vehicle;
    causing emission of the first noise pattern based on the operation of the first propulsion mechanism of the first aerial vehicle;
    causing emission of the second noise pattern based on the operation of the first propulsion mechanism of the first aerial vehicle;
    receiving, by an audio sensor of a second aerial vehicle, the first noise pattern emitted based on the operation of the first propulsion mechanism of the first aerial vehicle;
    receiving, by the audio sensor of the second aerial vehicle, the second noise pattern emitted based on the operation of the first propulsion mechanism of the first aerial vehicle;

processing, by the second aerial vehicle, the first noise pattern to determine at least one property associated with the first aerial vehicle;

processing, by the second aerial vehicle, the second noise pattern to determine at least one additional property associated with the first aerial vehicle; and instructing operation of the second aerial vehicle based at least in part on the at least one property and the at least one additional property associated with the first aerial vehicle.

17. The communication method of claim 16, wherein the at least one property associated with the first aerial vehicle comprises at least one of an identity, location, speed, direction, altitude, status, or flight plan.

18. The communication method of claim 16, further comprising:

receiving, by an audio sensor of the first aerial vehicle, a third noise pattern emitted based on operation of a second propulsion mechanism of the second aerial vehicle;

processing, by the first aerial vehicle, the third noise pattern to determine at least one property associated with the second aerial vehicle; and instructing operation of the first aerial vehicle based at least in part on the at least one property associated with the second aerial vehicle.

* * * * *